United States Patent
Schultz et al.

(10) Patent No.: US 7,841,520 B2
(45) Date of Patent: *Nov. 30, 2010

(54) METHOD OF PROVIDING AND PROCESSING A PLURALITY OF STORED-VALUE CARDS

(75) Inventors: Mark A. Schultz, Burnsville, MN (US); Dennis R. Smith, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,652

(22) Filed: Oct. 12, 2009

(65) Prior Publication Data

US 2010/0025462 A1  Feb. 4, 2010

Related U.S. Application Data

(63) Continuation of application No. 11/062,894, filed on Feb. 22, 2005, now Pat. No. 7,614,548.

(51) Int. Cl.
*G06K 5/00* (2006.01)

(52) U.S. Cl. .................................................. 235/380

(58) Field of Classification Search ................. 235/379, 235/380, 382, 383, 385, 486, 492, 493; 705/16
See application file for complete search history.

(56) References Cited

U.S. PATENT DOCUMENTS

| | | | |
|---|---|---|---|
| 4,519,498 A | 5/1985 | Booth | |
| 4,526,317 A | 7/1985 | Cassidy | |
| 4,978,146 A | 12/1990 | Warther et al. | |
| 5,305,383 A | 4/1994 | Guillou et al. | |
| 5,520,309 A | 5/1996 | Roth | |

(Continued)

FOREIGN PATENT DOCUMENTS

WO  2005045602 A2  5/2005

(Continued)

OTHER PUBLICATIONS dhc IS, Document Authorization System: Gift Certificate Orders, 8 pages, available more than on year prior to Feb. 22, 2005.

(Continued)

*Primary Examiner*—Seung H Lee
(74) *Attorney, Agent, or Firm*—Griffiths & Seaton PLLC

(57) ABSTRACT

A method of providing and processing a plurality of stored-value cards includes providing a stored-value card assembly including the plurality of stored-value cards in a housing. The plurality of stored-value cards includes a first stored-value card and a last stored-value card. Each of the plurality of stored-value cards is associated with a different account identifier linking each one of the plurality of stored-value cards to a different financial record or account. The different account identifiers collectively define a series of account identifiers. The method further includes scanning the different account identifier associated with the first stored-value card using a point-of-sale terminal, and scanning the different account identifier associated with the last stored-value card using the point-of-sale terminal. The housing indicates which of the different account identifier associated with the first stored-value card and the last stored-value card should be scanned first. Other card assemblies and associated methods are also disclosed.

20 Claims, 12 Drawing Sheets

U.S. PATENT DOCUMENTS

| | | |
|---|---|---|
| 5,777,305 A | 7/1998 | Smith et al. |
| D410,027 S | 5/1999 | Bartz |
| 5,918,909 A | 7/1999 | Fiala et al. |
| 5,921,584 A | 7/1999 | Goade, Sr. |
| 6,224,108 B1 | 5/2001 | Klure |
| 6,298,336 B1 | 10/2001 | Davis et al. |
| 6,328,341 B2 | 12/2001 | Klure |
| 6,439,613 B2 | 8/2002 | Klure |
| 6,502,745 B1 | 1/2003 | Stimson et al. |
| 6,588,658 B1 | 7/2003 | Blank |
| 6,715,795 B2 | 4/2004 | Klure |
| 6,957,737 B1 | 10/2005 | Frederickson et al. |
| 7,191,939 B2 | 3/2007 | Beck et al. |
| 2001/0045738 A1 | 11/2001 | Klure |
| 2002/0088855 A1 | 7/2002 | Hodes |
| 2004/0134825 A1 | 7/2004 | Navickas |
| 2004/0139318 A1 | 7/2004 | Fiala et al. |
| 2005/0091115 A1 | 4/2005 | Arthur |

OTHER PUBLICATIONS

Target Corporation, Gift Card 2000, Corporate Gift Cards.

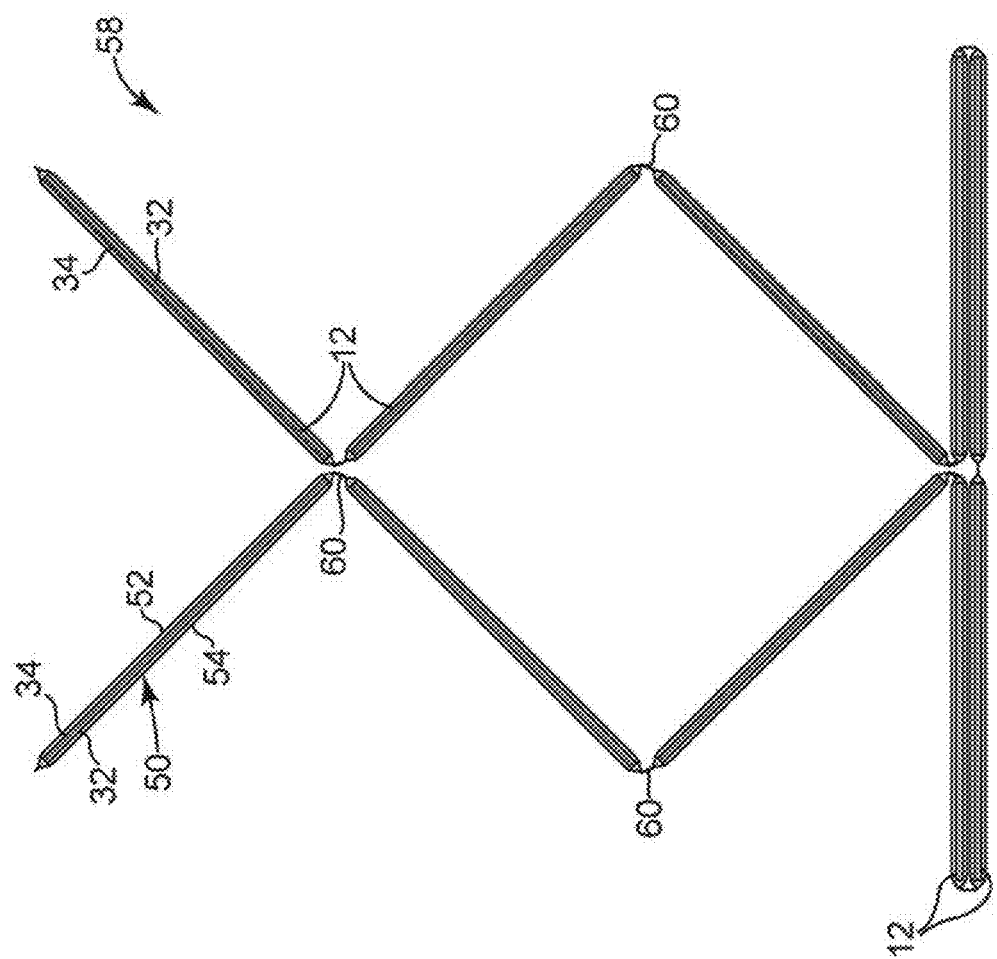

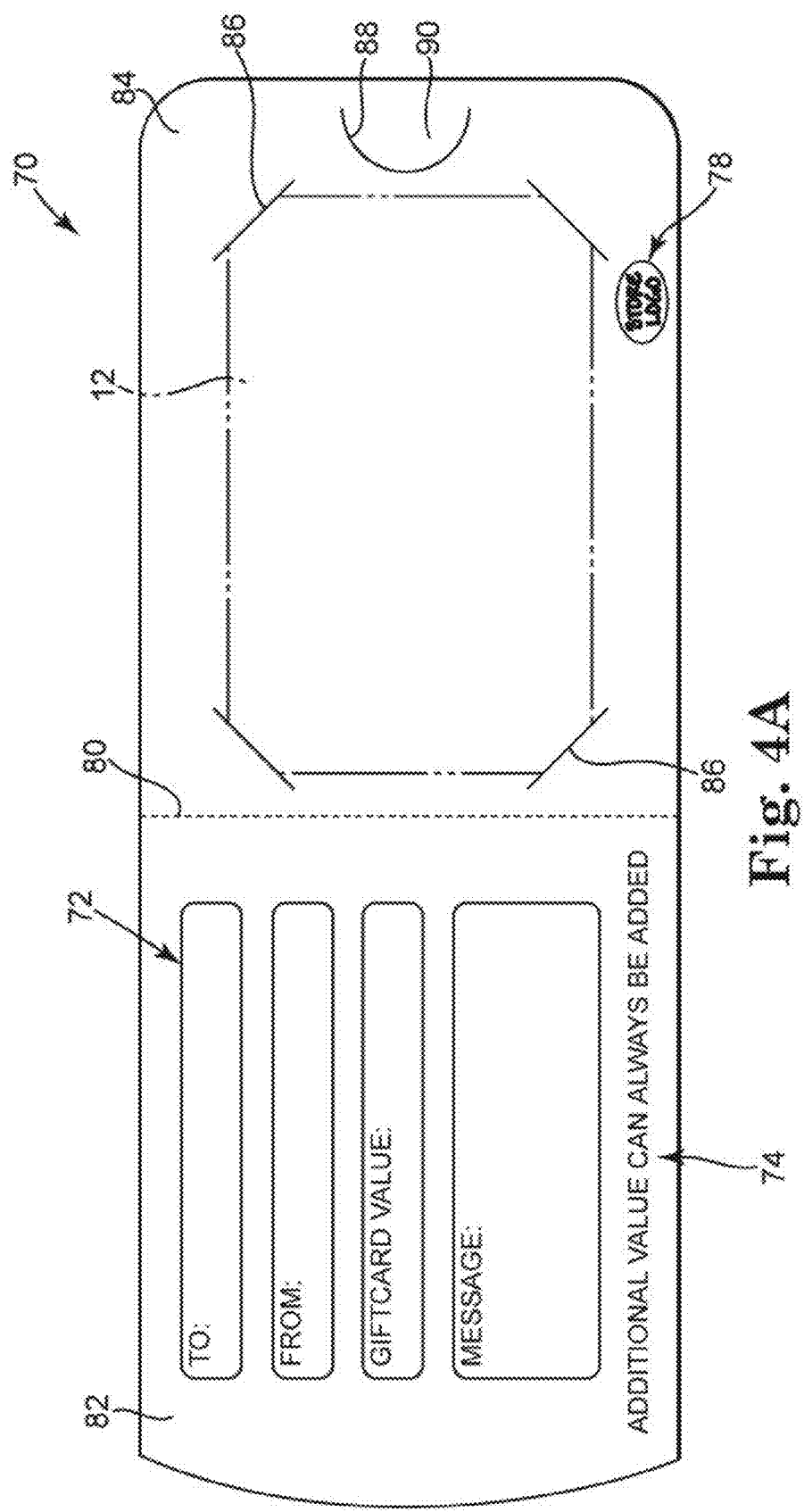

METHOD OF PROVIDING AND PROCESSING A PLURALITY OF STORED-VALUE CARDS

CROSS-REFERENCE TO RELATED APPLICATION

The present application is a Continuation of U.S. application Ser. No. 11/062,894, filed Feb. 22, 2005, which is incorporated herein by reference.

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a method of providing and processing a plurality of stored-value cards. The method includes providing a stored-value card assembly including the plurality of stored-value cards maintained in a housing. The plurality of stored-value cards includes a first stored-value card and a last stored-value card. Each of the plurality of stored-value cards is associated with a different account identifier linking each respective one of the plurality of stored-value cards to a different financial record or account. The different account identifiers of the plurality of stored-value cards collectively define a series of account identifiers bounded by the different account identifier associated with the first stored-value card and the different account identifier associated with the last stored-value card. The method further includes scanning the different account identifier associated with the first stored-value card using a point-of-sale terminal, and scanning the different account identifier associated with the last stored-value card using the point-of-sale terminal. The housing indicates which of the different account identifier associated with the first stored-value card and the different account identifier associated with the last stored-value card should be scanned first. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 3 is a side view of one embodiment of the chain of stored-value cards of FIGS. 2A and 2B being folded for placement in a stored-value card assembly, according to the present invention.

FIG. 4A is a front view of one embodiment of an unfolded carrier of a stored-value card assembly, according to the present invention.

DETAILED DESCRIPTION

A gift card, financial transaction card, or other stored-value card is adapted for making purchases of goods and/or services from e.g. a retail store or website. According to one embodiment, an original consumer buys a stored-value card to give a recipient who in turn is able to use the stored-value card at a retail store or setting to pay for the goods and/or services. Oftentimes, a consumer wishes to buy a large number of stored-value cards in a single transaction. This is particularly common for business owners or employers who purchase stored-value cards for a number of employees during the holiday season, as part of a motivation or team-building program, or for any other occasion.

A stored-value card assembly, according to embodiments of the present invention, provides the consumer with the ability to activate a range of stored-value cards at one time rather than activating one stored-value card at time. By activating a range of stored-value cards at one time, check-out or activation time is decreased, thereby increasing store efficiency and consumer satisfaction. This benefit further increases as the number of stored-value cards being purchased by a consumer increases from ten to twenty, twenty to fifty, and so on.

Figure 1:
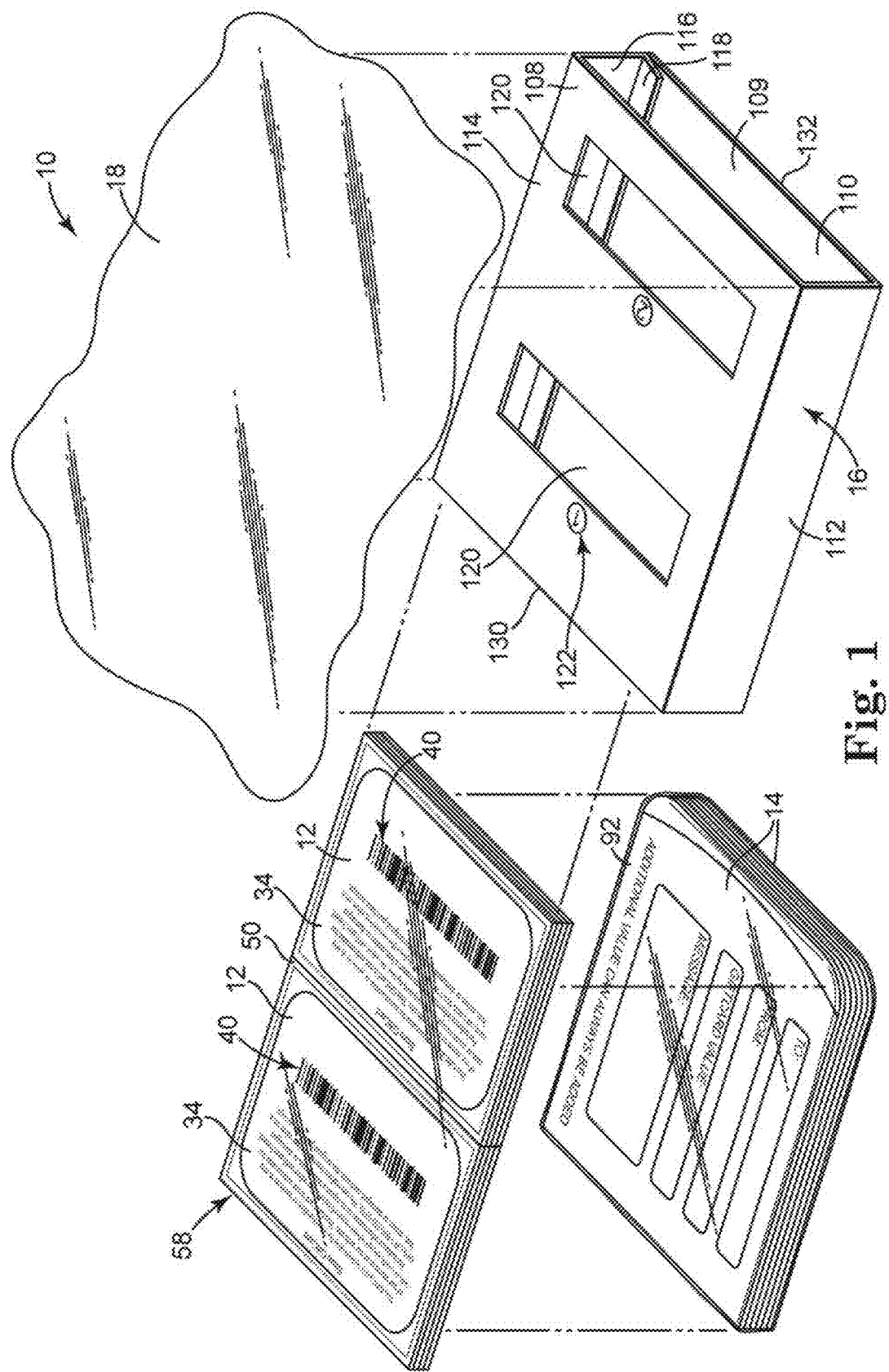
FIG. 1 is an exploded, top perspective view of one embodiment of a stored-value card assembly, according to the present invention.

Turning to the figures, FIG. 1 is an exploded, top perspective view of one embodiment of stored-value card assembly 10, according to the present invention. Stored-value card assembly 10 includes a plurality of stored-value cards 12 maintained in a package for sale as a packaged unit. In one embodiment, stored-value card assembly further includes a plurality of backers 14 for supporting the stored-value cards 12, housing or sleeve 16, and external wrapper 18. The plurality of stored-value cards 12 are stacked with the plurality of backers 14 and slid into sleeve 16. External wrapper 18 extends about the remainder of stored-value card assembly 10 to selectively maintain stored-value cards 12 and backers 14 within sleeve 16. Accordingly, the plurality of stored-value cards 12 and backers 14 are collectively packaged for purchase during a single transaction.

Figure 2A:
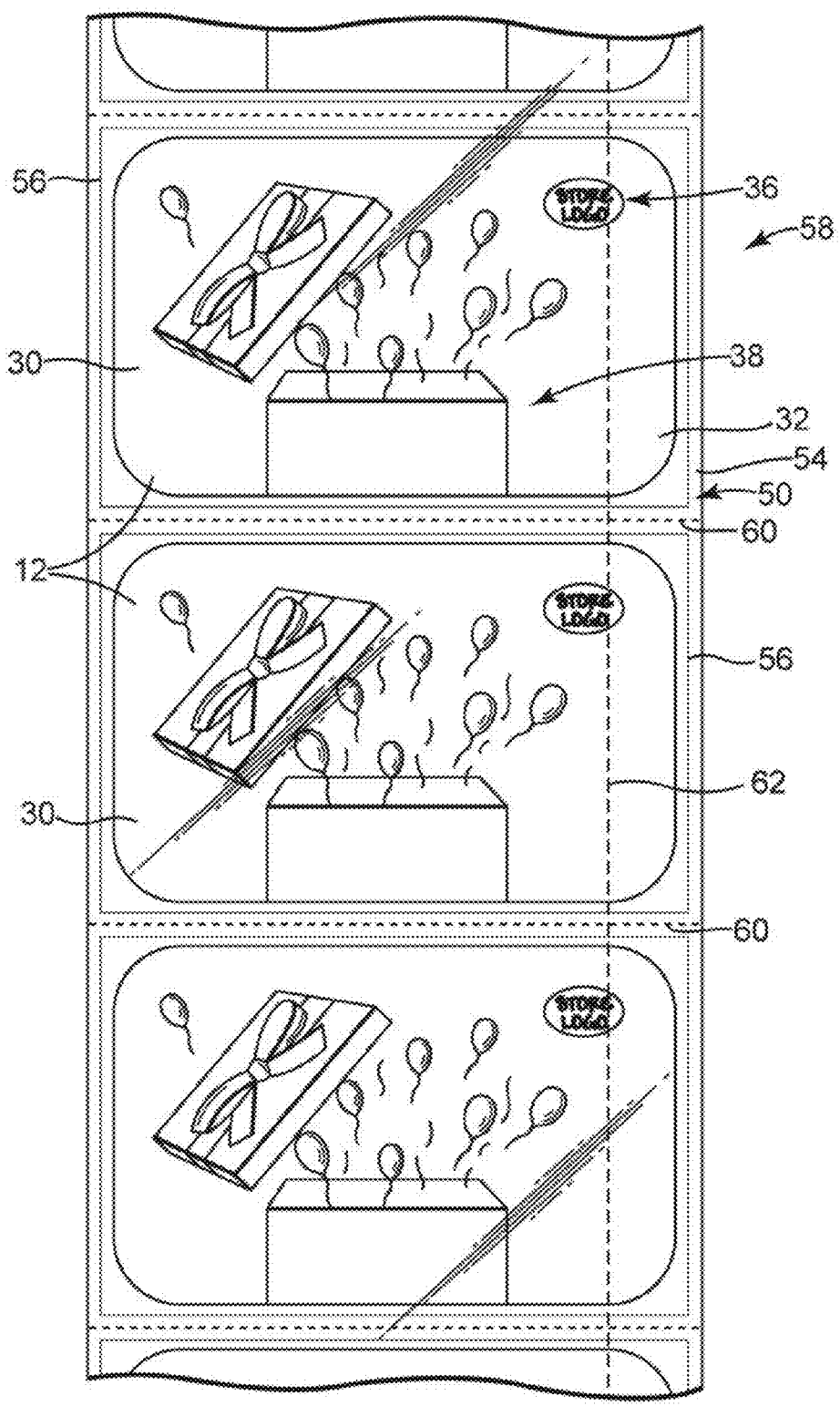
FIG. 2A is a top view of one embodiment of a chain of stored-value cards included in the stored-value card assembly of FIG. 1.
Figure 2B:
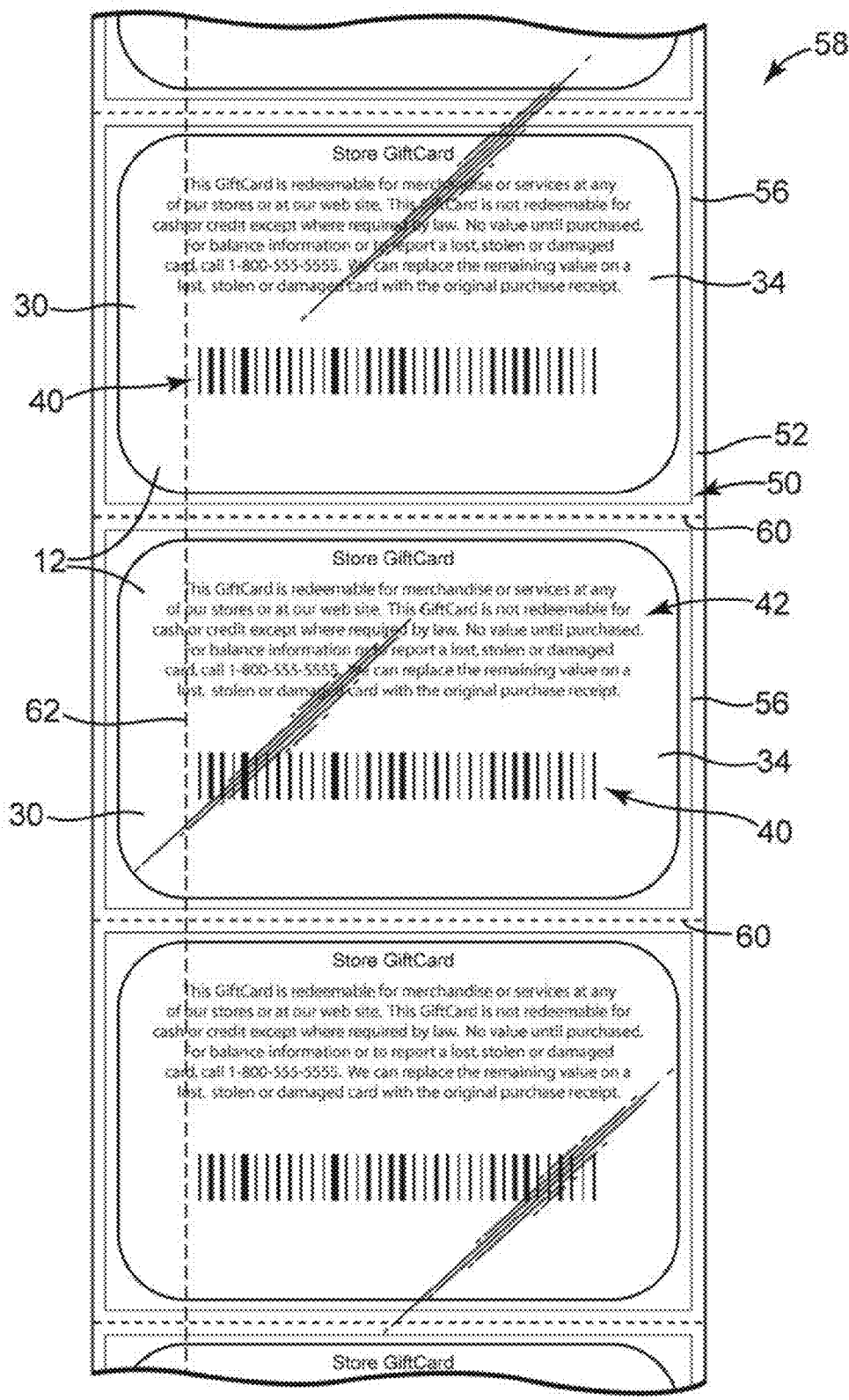
FIG. 2B is a bottom view of the chain of stored-value cards of FIG. 2A.

One embodiment of a representative portion of a plurality of stored-value cards 12 is illustrated with additional reference to FIGS. 2A and 2B. Each of the plurality of stored-value cards 12 includes a generally planar panel 30 defining first planar surface 32 and second planar surface 34 opposite first surface 32. In one embodiment, planar panel 30 is generally rectangular in shape and is of a size similar to that of an identification card, a credit card, or other card sized to fit in a wallet of a card bearer. In particular, in one embodiment, stored-value card 12 is about 8.5 cm long, about 5.5 cm wide, and less than about 1 mm thick. In other embodiments, planar panel 30 is otherwise shaped as a square, circle, oval, star, or any other suitable shape. Accordingly, planar panel 30 is formed of a somewhat rigid yet flexible material similar to that commonly used for identification cards, credit cards, etc. In one embodiment, planar panel 30 is formed of a paper, card stock, plastic, e.g. polycarbonate or polyvinyl chloride (PVC), etc. In one embodiment, planar panel 30 is formed of injection molded plastic or cut from sheet-stock plastic material.

First surface 32 includes brand indicia 36 and/or decorative indicia 38. In one embodiment, brand indicia 36 identify a brand, e.g. a product brand, a store brand, etc., associated with stored-value card assembly 10. In one embodiment, decorative indicia 38 include a background design, seasonal or holiday identifier, occasion identifier, media format indicia, and/or any other suitable indicia. In one embodiment, each of the plurality of stored-value cards 12 includes similar, identical, or coordinating decorative indicia as compared to the other stored-value cards 12. In another embodiment, each of the plurality of stored-value cards 12 represents a different occasion, event, holiday, etc. For example, one stored-value card 12 includes decorative indicia 38 relating to a birthday, while another stored-value card 12 includes decorative indicia relating to a baby shower.

Second surface 34 of each stored-value card 12 includes account identifier 40, such as a barcode, a magnetic strip, a smart chip or other electronic device, a radio frequency identification device, or other suitable identifier readily readable by a point-of-sale terminal, account access station, kiosk, or other suitable device. In one embodiment, account identifier 40 is printed on second surface 34 of stored-value card 12. Account identifier 40 indicates a financial account or record to which stored-value card 12 is linked. The account or record of the monetary balance on stored-value card 12 optionally is maintained on a database, other electronic or manual record-keeping system, or, in the case of "smart" cards, for example, on a chip or other electronic device on stored-value card 12 itself. Accordingly, by scanning account identifier 40, a financial account or record linked to stored-value card 12 is identified and can subsequently be activated, have amounts debited therefrom, and/or have amounts added thereto. With the above in mind, account identifier 40 is one example of means for linking stored-value card 12 with a financial account or record and is one example of means for activating or loading value on stored-value card 12.

In one embodiment, redemption indicia 42 are included on second surface 34. Redemption indicia 42 indicate that each stored-value card 12 is redeemable for the purchase of goods and/or services and that, upon use, a value of the purchased goods and/or services will be deducted from the financial account or record linked to stored-value card 12. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc. In one embodiment, other indicia are also included on second surface 34 including other objects, texts, backgrounds, graphics, etc.

The plurality of stored-value cards 12 are each enclosed within card wrapper 50 such as a plastic wrapper. In particular, stored-value cards 12 are arranged as a generally linear array and are each individually enclosed within card wrapper 50. Card wrapper 50 includes first or bottom sheet 52 and second or top sheet 54. Each stored-value card 12 is placed between first and second sheets 52 and 54, and sheets 52 and 54 are sealed, as generally indicated in FIGS. 2A and 2B at 56, about each stored-value card 12, for example, about all four sides of each stored value card 12. Accordingly, a pouch or cavity is defined between sheets 52 and 54 for maintaining each stored-value card 12. For example, sheets 52 and 54 are elongated and stored-value cards 12 are spaced linearly between sheets 52 and 54 to form chain 58 of stored-value cards 12.

In one embodiment, a tear area or perforated line 60 is formed in each sheet 52 and 54 between two neighboring stored-value cards 12. More specifically, perforated line 60 extends laterally between two stored-value cards 12 without generally breaking or decreasing the integrity of seal 56 around each of the neighboring stored-value cards 12. Perforated line 60 facilitates folding of card wrapper 50 between each stored-value card 12 and also facilitates tearing of card wrapper 50 between cards to remove one or more of the stored-value cards 12 from the remainder of chain 58. In one embodiment, since perforated line 60 is positioned between two seal lines 56, one next to a first stored-value card 12 and the other next to a second stored-value card 12, tearing card wrapper 50 at perforated line 60 to separate stored-value cards 12 from chain 58 does not release a stored-value card 12 from its respective pouch. In one embodiments, other tear areas, such as areas of card wrapper 50 that are thinner, weaker, or otherwise configured to tear more easily than other portions of card wrapper 50, are used as an alternative to perforated line 60.

In one example, opening perforated line 62 or other tear area extends parallel to but spaced from a longitudinal edge of card wrapper 50. Perforated line 62 is formed through first and second sheets 52 and 54. Accordingly, upon tearing card wrapper 50 along perforated line 62, a pouch or chamber is opened to permit access to the at least one stored-value card 12 placed within the respective pouch. As such, at least one stored-value card 12 can be slid through the newly created opening and removed from the respective pouch.

Card wrapper 50, and more particularly, each sheet 52 and 54, is generally transparent or translucent. In one embodiment, card wrapper 50 is sufficiently translucent to allow account identifier 40 to be scanned and/or read through card wrapper 50. In one example, card wrapper 50 is oriented polypropylene (OPP), cast polypropylene (CPP), polyethylene (PE), or other suitable plastic wrap. Seals 56 are formed via heat, sonic, or other suitable sealing method. As such, card wrapper 50 provides one example of means for coupling the plurality of stored-value cards 12 to one another in a chain.

As illustrated in FIG. 3, in one embodiment, chain 58 of stored-value cards 12 is positioned or stacked for packaging within sleeve 16 by folding chain 58 at each perforated line 60 in an alternating direction, i.e., chain 58 is folded in accordion style. In one embodiment, stored-value cards 12 are, more particularly, folded in a manner to form two adjacent stacks or piles of stored-value cards 12. As such, card wrapper 50 is not folded about the middle perforated line 60 in chain 58. More specifically, chain 58 is folded such that second surfaces 34 of the first and the last stored-value card 12 in chain 58 are viewable from the top of the stacks. In this manner, account identifier 40 (illustrated in FIG. 2B) of each of the first and last stored-value cards 12 is also viewable from the top of the stacks.

Figure 4B:
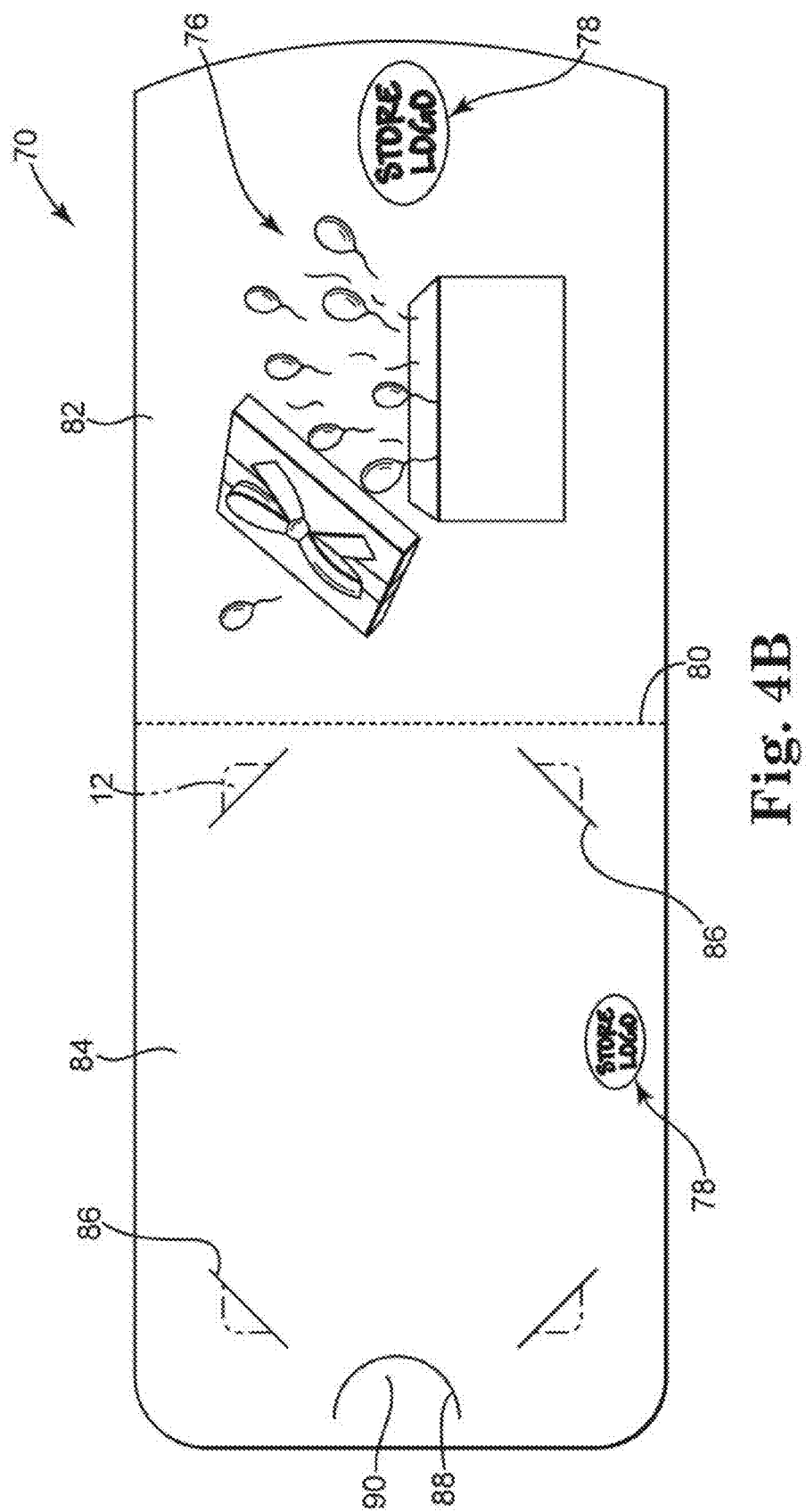
FIG. 4B is a back view of the unfolded carrier of FIG. 4A.

FIGS. 4A and 4B illustrate carrier or backer 14 for supporting one of stored-value cards 12. Backer 14 comprises a single layer or multiple layers of paper or plastic material, for example, generally in the form of a relatively stiff but bendable/flexible card. Other materials are also contemplated. Backer 14 displays indicia, graphics or text information including store logo(s), store name(s), slogans, advertising, instructions, directions, brand indicia, promotional information, holiday indicia, seasonal indicia, media format identifiers (e.g. characters, logos, scenes, or other illustrations relating to at least one of a movie, television show, book, etc.), characters, and/or other information.

Indicia 72, for example, include to, from, initial gift card value, and message fields. Indicia 74 notify a user and promote that additional value can always be added to or reloaded to stored-value card 12. Indicia 76 are decorative indicia contributing to the overall aesthetics of backer 14. In one embodiment, indicia 76 relate to promotional information, holiday indicia, seasonal indicia, media format identifiers (e.g. characters, logos, scenes, or other illustrations relating to at least one of a movie, television show, book, etc.), characters, and/or other information. In an example, indicia 76 are similar to or correspond with decorative indicia 38 of a related stored-value card 12. Indicia 78 identify a store, brand, department, etc. and/or services associated with stored-value card 12. Any of indicia 72, 74, 76, 78, or other indicia, optionally may appear anywhere on backer 14 or the associated stored-value card 12. Additional information besides that specifically described and illustrated herein also may be included.

In one embodiment, backer 14 is a bi-fold substrate defining fold line 80, about which backer 14 is foldable roughly in half to define a first panel 82 and a second panel 84. Second panel 84 is configured to receive a stored-value card 12. As such, in one embodiment, at least two slits 86 are formed through second panel 84 and positioned to receive a portion of stored-value card 12. For example, each slit 86 is formed in an angled manner to correspond with one corner of stored-value card 12. Upon placement of stored-value card 12, each corner is slid through one slit 86 to collectively hold stored-value card 12 in place on backer 14. In one embodiment, four slits 86 are formed, each slit 86 positioned to receive one of the four corners of stored-value card 12. Other suitable methods of coupling a stored-value card 12 to backer 14 such as adhesive or pockets are also contemplated.

In FIGS. 4A and 4B, backer 14 is unfolded, i.e. is in an open configuration. Prior to presentation of a stored-value card 12 and backer 14 to a recipient, backer 14 is foldable about fold line 80 such that the FIG. 4A surfaces of backer 14 are folded towards each other and stored-value card 12 is enclosed in a compact package formed by folded backer 14. In this manner, the surfaces of backer 14 illustrated in FIG. 4B are disposed toward the outside of the folded, compact package, according to embodiments of the invention. In one embodiment, folded backer 14 effectively wraps stored-value card 12 for presentation to a recipient. In one embodiment, fold line 80 is alternatively two fold lines slightly spaced from one another to accommodate a thickness of stored-value card 12.

In one embodiment, backer 14 optionally includes a generally semi-circular cut 88 formed near an outside edge of second panel 84 opposite first panel 82. In one embodiment, cut 88 is generally centered upon second panel 84. Accordingly, semi-circular cut 88 defines a generally semi-circular flap 90, which can be partially bent away from the remainder of backer 14. More specifically, upon folding of backer 14 about fold line 80 to enclose stored-value card 12, flap 90 is pulled away from the remainder of second panel 84 to interface with an opposing edge of first panel 82. In this respect, the opposing edge of first panel 82 can be tucked beneath flap 90 to maintain backer 14 in a folded or closed position (not shown). Backers similar to backer 14 can be used with various sizes and shapes of stored-value card assembly 10. Other backers or packages are also contemplated for supporting stored-value card assembly 10.

Additionally referring to FIG. 1, backers 14 are folded about fold line 80 and stacked for inclusion in stored-value card assembly 10. In one example, the stack of backers 14 is wrapped in a plastic, paper, or other suitable backer wrapper 92 to maintain the stack of backers 14 as a unit. In one embodiment, backer wrapper 92 is a cellophane, heat shrunk or other wrapper. In one embodiment, backer wrapper 92 is generally transparent or translucent. Generally, the stack of backers 14 includes a number of backers 14 equal to the number of stored-value cards 12 in chain 58, such as ten, twenty, fifty, etc.

Figure 5:
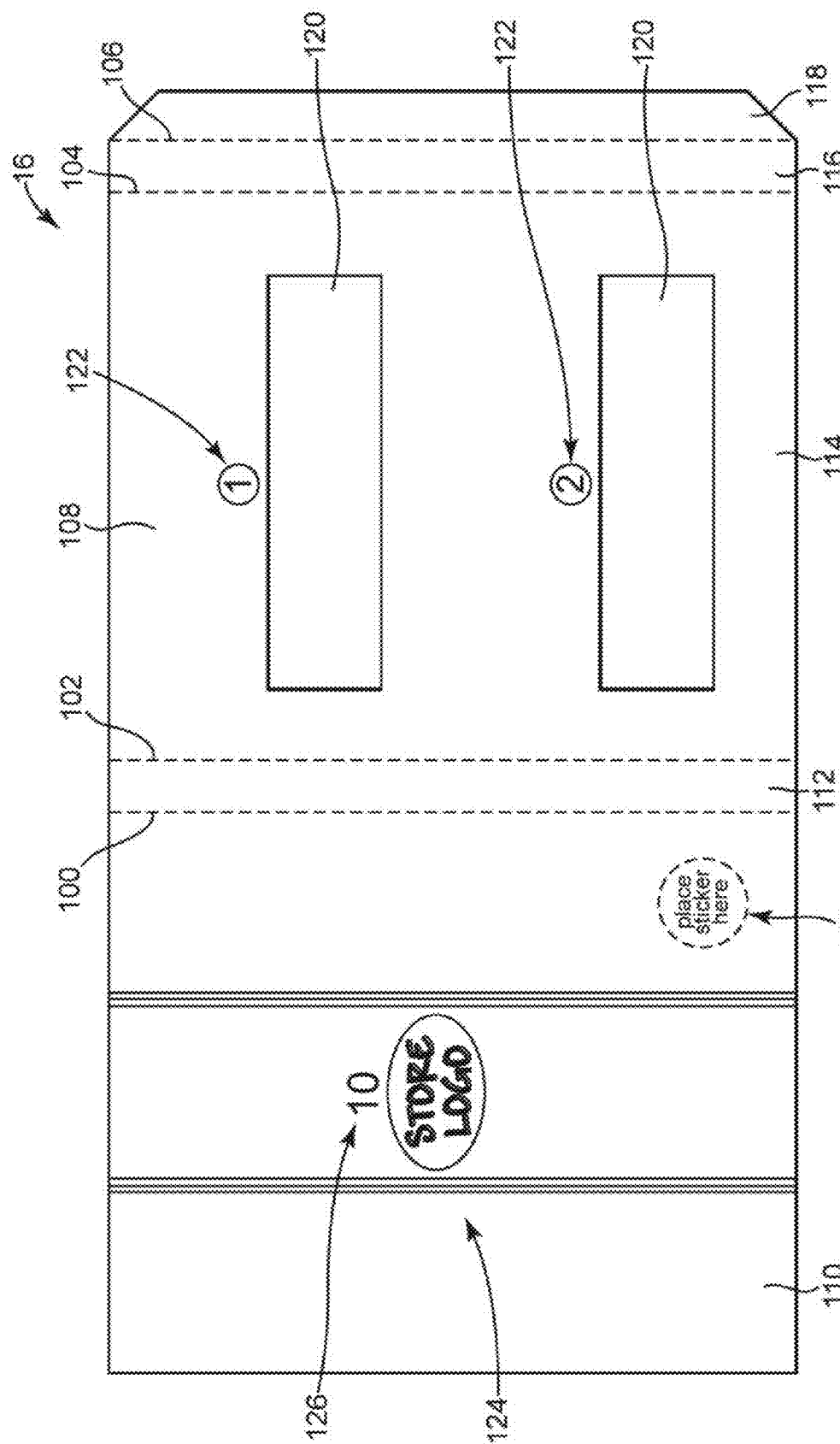
FIG. 5 is a front view of one embodiment of an unfolded sleeve of a stored-value card assembly, according to the present invention.

FIG. 5 illustrates one embodiment of sleeve 16. Sleeve 16 comprises a single layer or multiple layers of paper or plastic material, for example, and is relatively stiff but bendable/flexible, according to embodiments of the invention. Other materials are also contemplated. Accordingly, sleeve 16 defines outside surface 108 and inside surface 109 (FIG. 1) opposite outside surface 108. In one embodiment, each surface 108 and 109 is generally planar. Sleeve 16 includes first, second, third, and fourth perforation lines 100, 102, 104, and 106, respectively, extending laterally and parallel to one another. Perforation lines 100, 102, 104, and 106 divide sleeve 16 into five panels, namely, first or top panel 110, second or side panel 112, third or bottom panel 114, fourth or side panel 116, and connection tab 118. In one embodiment, top panel 110 and bottom panel 114 are similarly sized, and side panels 112 and 116 are similarly sized.

A pair of apertures 120 are formed through bottom panel 114. In one embodiment, each aperture 120 is generally rectangular and extends in a generally longitudinal manner on bottom panel 114. Each aperture 120 is laterally spaced from one another. In particular, each aperture 120 is positioned to generally align with one of the account identifiers 40 on the top of the stacks of stored-value cards 12, as illustrated with additional reference to FIG. 1 and/or FIG. 6B. In one embodiment, indicia 122 are included on outside surface 108 of bottom panel 114 to indicate the order in which the viewable account identifiers 40 should be scanned during activation.

In one embodiment, sleeve 16 displays indicia 124, which include graphics or text including store logo(s), store name(s), slogans, advertising, instructions, directions, brand indicia, promotional information, holiday indicia, seasonal indicia, media format identifiers (e.g. characters, logos, scenes, or other illustrations relating to at least one of a movie, television show, book, etc.), characters, etc. Other information and other indicia are also contemplated. For example, sleeve 16 includes indicia 126 identifying how many stored-value cards 12 are included in stored-value card assembly 10. Indicia 128 indicate a position for placement of a sticker to indicate the value of each stored-value card 12 in stored-value card assembly 10.

Figure 6A:
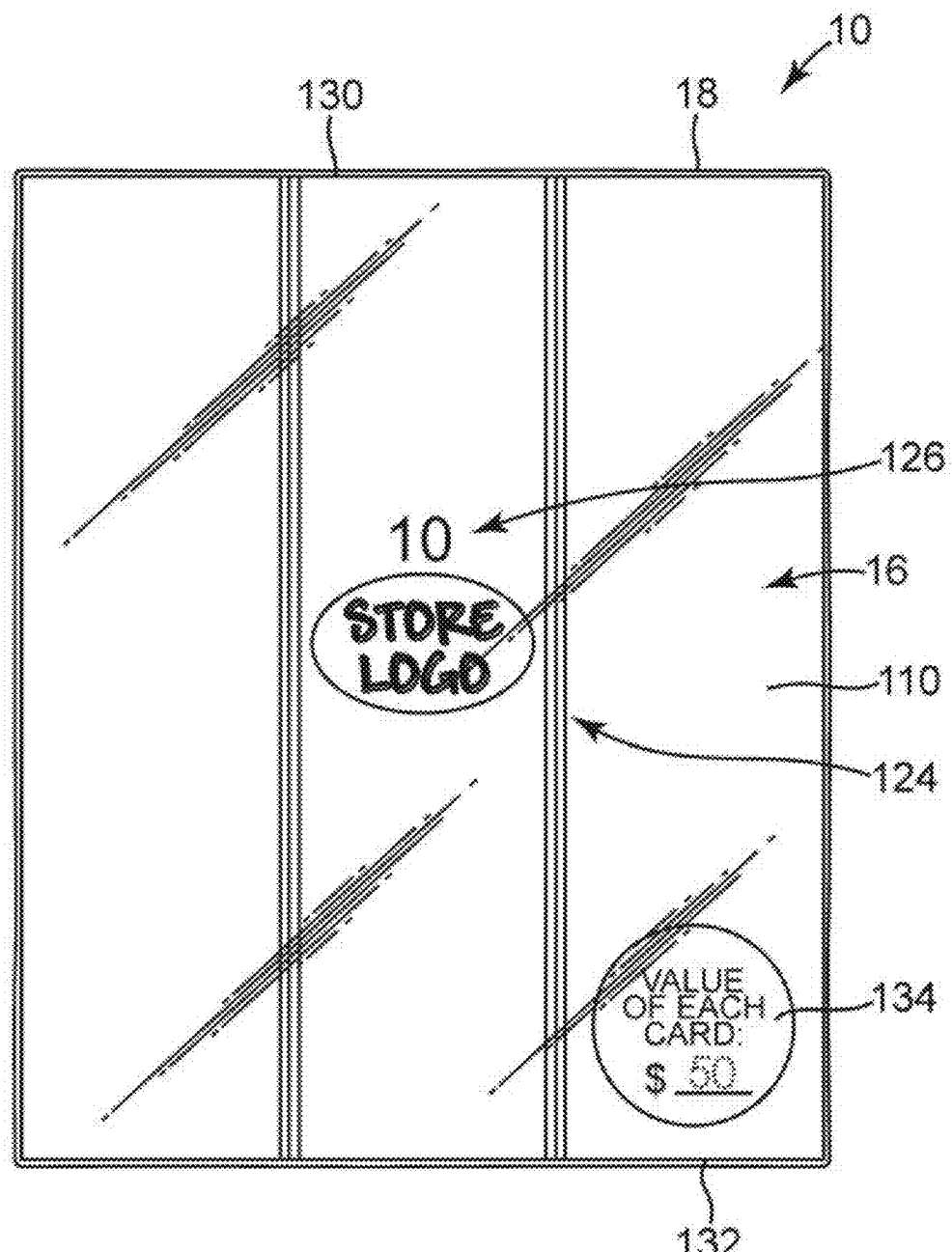
FIG. 6A is a front view of one embodiment of an assembled stored-value card assembly, according to the present invention.
Figure 6B:
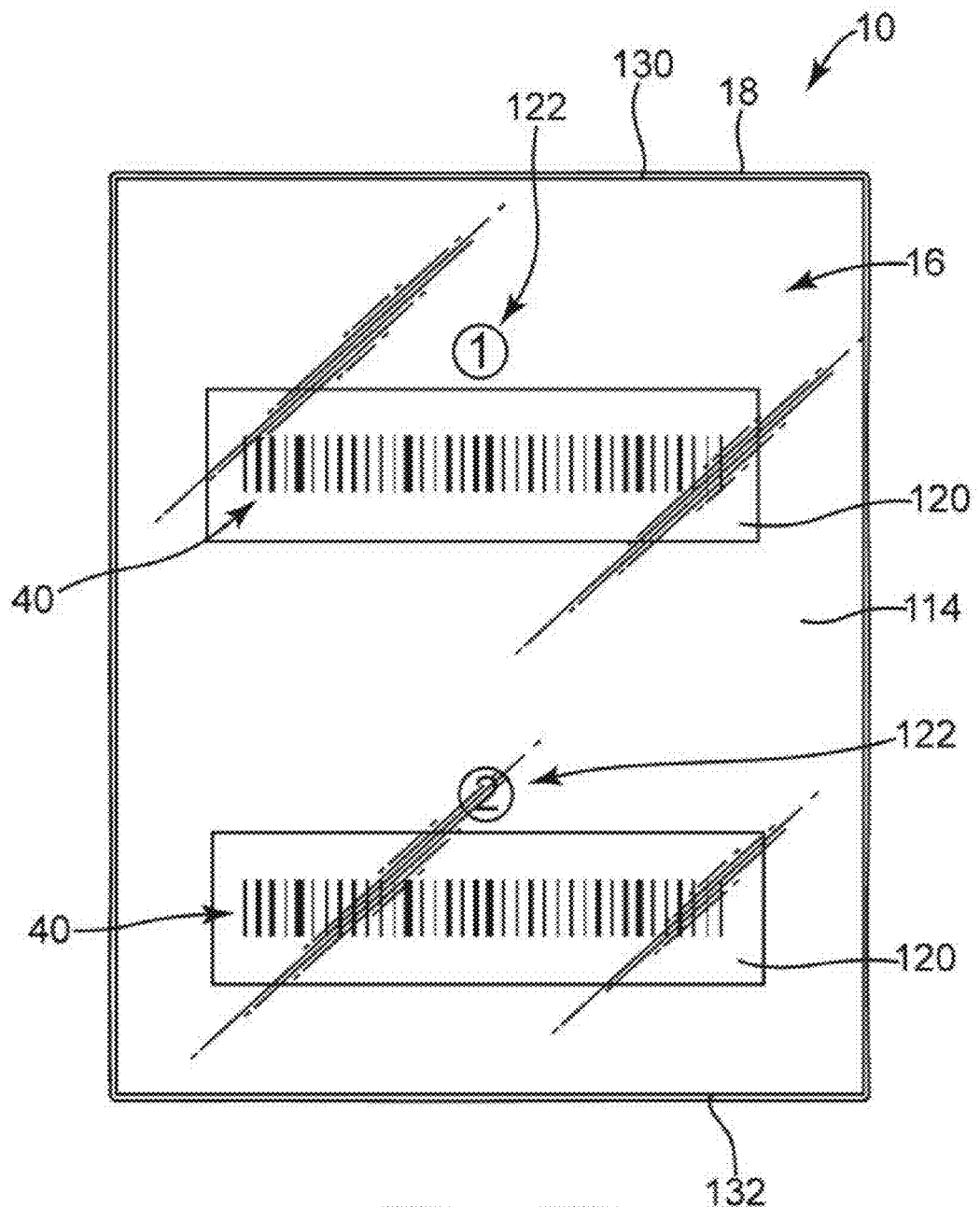
FIG. 6B is a back view of the assembled stored-value card assembly of FIG. 6A.

Referring to FIG. 1 and the fully assembled views of FIGS. 6A and 6B, upon assembly, sleeve 16 is folded about each perforation line 100, 102, 104, and 106 in a similar direction to form sleeve 16 as a rectangular tube with inside surface 109 facing inward. Connection tab 118 is folded under to interface with inside surface 109 of top panel 110. More specifically, connection tab 118 is adhered to or otherwise secured to top panel 110 to maintain sleeve 16 as the rectangular tube. As such, folded sleeve 16 defines a first open end 130 and a second open end 132 opposite first open end 130. However, otherwise shaped and configured sleeves or housings are also contemplated.

Upon assembly of stored-value card assembly 10, the stack of backers 14 are generally aligned with and placed beneath the stack of stored-value cards 12. Stored-value cards 12 and backers 14 are slid into first open end 130 of sleeve 16 until account identifiers 40 of the first and last stored-value cards 12 in the stack or chain 58 are each visible through one of apertures 120. In particular, account identifier 40 of a first card in chain 58 is visible through aperture 120 near first open end 130 of sleeve, and account identifier 40 of a last stored-value card 12 in chain 58 is visible through aperture 120 near second open end 132.

External wrapper 18 is placed about sleeve 16 containing stored-value cards 12 and the stack of backers 14. In one embodiment, external wrapper 18 is a cellophane or other suitable material configured to be sealed about the remainder of stored-value card assembly 10. In one example, external wrapper 18 is generally placed over first panel 110 and extends around the panels 112, 114, and 116. External wrapper 18 includes a heat seal adhering one portion of external wrapper 18 to another to collectively form and entirely encompass the remainder of the stored-value card assembly 10. In this respect, stored-value cards 12 and the stack of backers 14 are maintained within sleeve 16.

External wrapper 18 is generally transparent or translucent in order to allow a bearer of stored-value card assembly 10 to view sleeve 16 and the two account identifiers 40 through apertures 120 through external wrapper 18. More specifically, in one embodiment, account identifier 40 is viewable and scannable through external wrapper 18. In this respect, stored-value cards 12 can be activated or loaded by scanning account identifiers 40 through external wrapper 18. As such, the scannable account identifiers provide one example of means for activating the stored-value cards 12 as will be further described below.

In other examples, external wrapper 18 is another suitable and generally translucent or transparent material secured about and vacuum or otherwise sealed to the remainder of stored-value card assembly 10. In one example, external wrapper 18 is heat shrunk to fit around the remainder of stored-value card assembly 10. Accordingly, sleeve 16 and/or wrapper 18 provide one example of means for maintaining the plurality of stored-value cards 12 in a single package.

Once external wrapper 18 is secured about sleeve 16, in one embodiment, a sticker 134 is applied to external wrapper 18 to provide a surface for accepting ink. In particular, sticker 134 states that the value added to each stored-value card 12 of the package should be written in at the point-of-sale terminal. For example, sticker 134 may state "Value of each card $_____." Upon activation of stored-value cards 12 in stored-value card assembly 10, the clerk, consumer, or other individual writes the value loaded to each stored-value card 12 in the blank provided by sticker 134, for example as generally indicated in dashed lines in FIG. 6A.

Once fully assembled, stored-value card assembly 10 is configured for display or presentation to potential consumers. The external wrapper 18 generally maintains the entire stored-value card assembly 10 as a package for sale as a single unit. In one embodiment, even if external wrapper 18 is removed, card wrapper 50 generally maintains stored-value cards 12 in chain 58 to generally prevent or impede inadvertent or deliberate removal of stored-value cards 12 from the middle of chain 58. More specifically, chain 58 generally prevents or impedes removal of one of stored-value cards 12 in the middle of chain 58, i.e., between the first stored-value card 12 and the last stored-value card 12 in chain 58. This is an advantage as, otherwise, removal of a stored-value card 12 in the middle of chain 58 might go undetected until well after activation of stored-value cards 12 in stored-value card assembly 10, in which case a consumer would pay for all stored-value cards 12 in the expected range, even though at least one stored-value card 12 might be missing from that range. Following activation, a holder of the missing stored-value card 12, other than the consumer or intended recipient, could then redeem the stored-value card 12 for goods and/or services. Embodiments of the invention thus reduce the likelihood of theft of one or more of stored-value cards 12 in chain 58.

Figure 7:
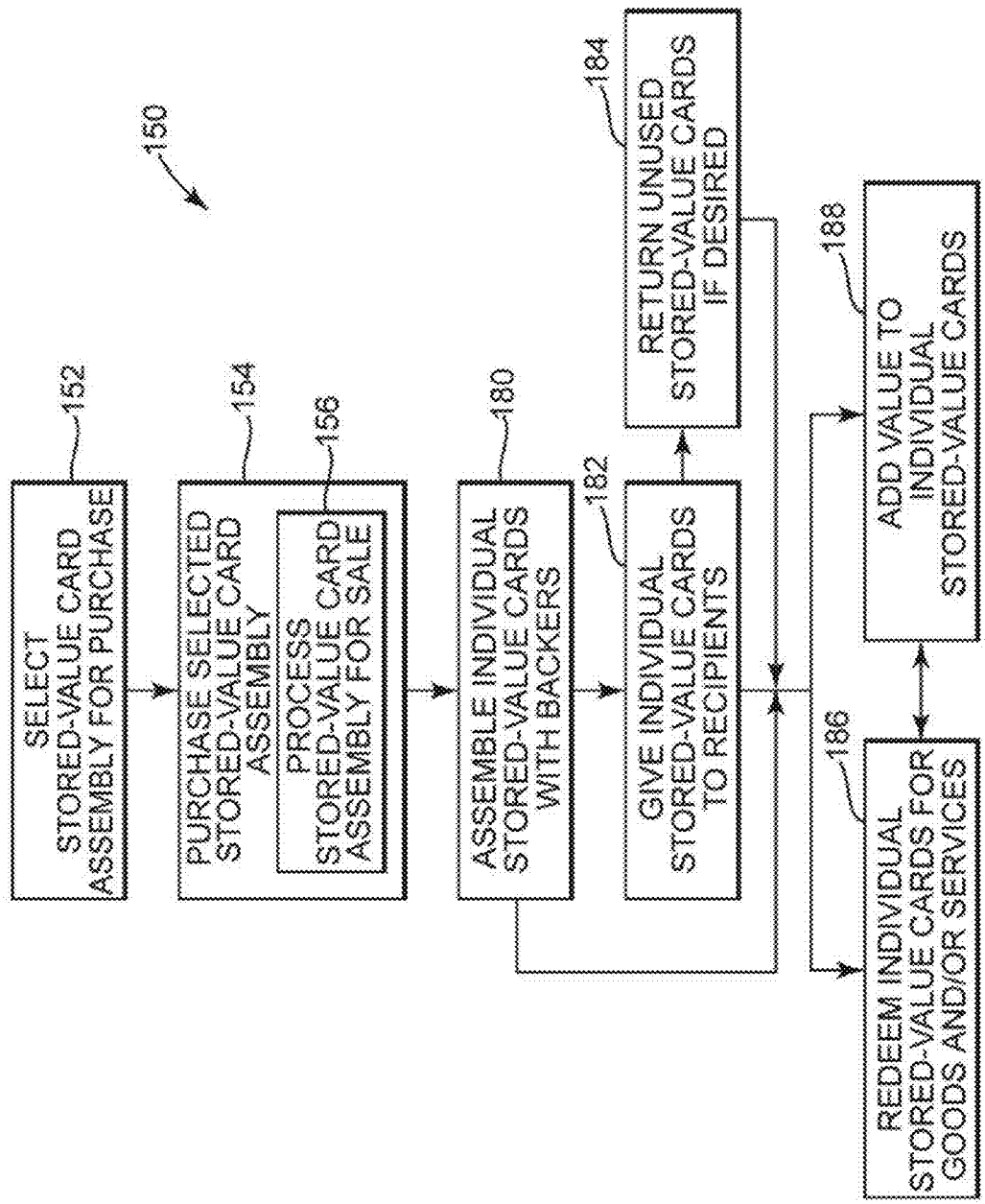
FIG. 7 is a flow chart illustrating one embodiment of a method of using a stored-value card assembly, according to the present invention.

FIG. 7 illustrates a flow chart of one embodiment of a method 150 of using stored-value card assembly 10. At 152, a potential consumer of stored-value card assembly 10, which is displayed in a retail store, selects a stored-value card assembly 10 for purchase from the retail store. For example, stored-value card assembly 10 is one of a plurality of stored-value card assemblies displayed in a retail setting to potential consumers. In one embodiment, different stored-value card assemblies 10 are displayed having different numbers (e.g., ten, twenty, fifty, etc.) of stored-value cards 12 included in each stored-value card assembly 10. In one embodiment, different stored-value card assemblies 10 are displayed to potential consumers for different holidays, events, or other occasions.

Figure 8:
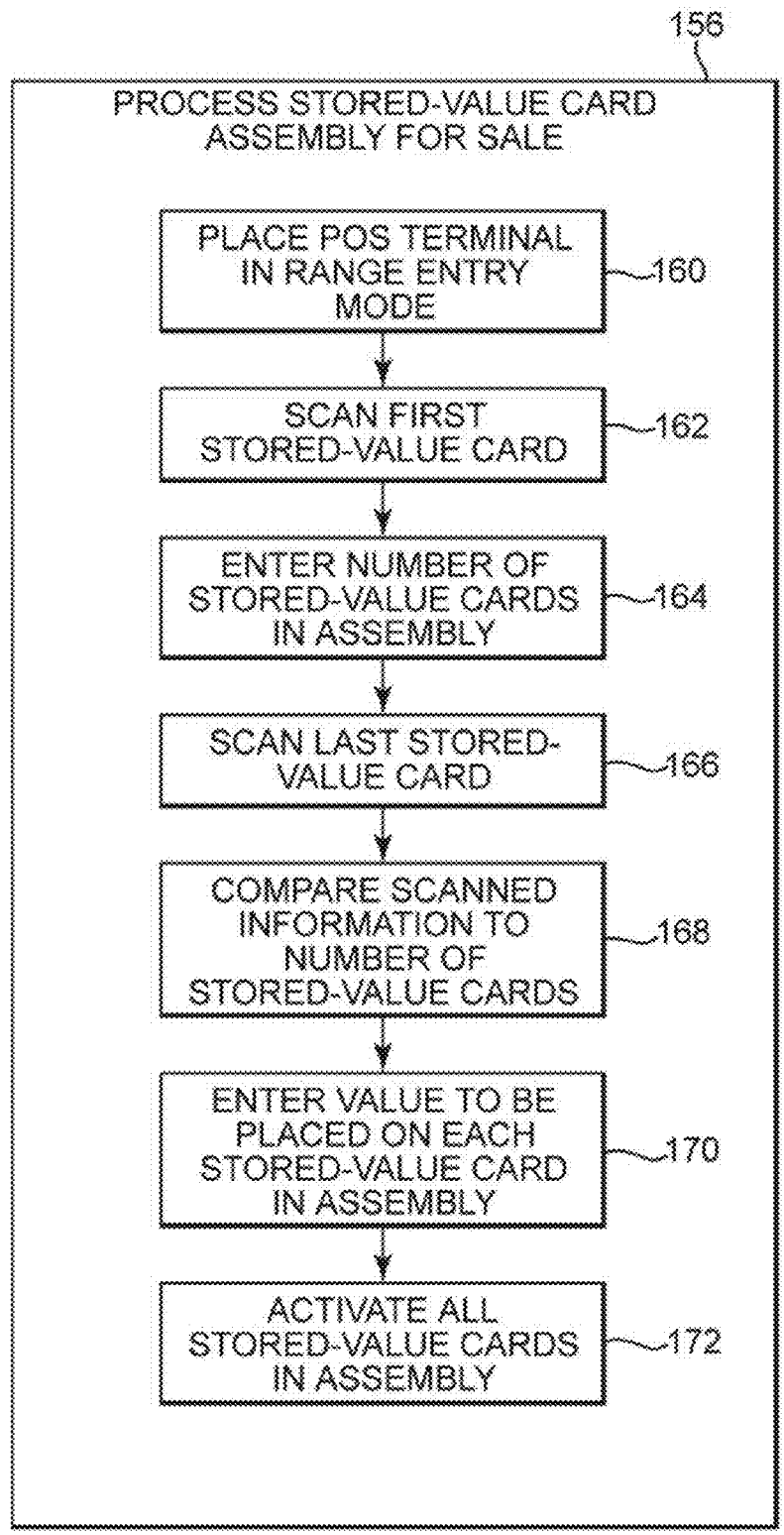
FIG. 8 is a flow chart illustrating one embodiment of a method of processing a stored-value card assembly for sale as part of the method of FIG. 7.

At 154, the selected stored-value card assembly 10 is purchased by the consumer. In particular, at 156, stored-value card assembly 10 is presented to and processed for sale by a retail store employee, retail store kiosk, or other person or device. FIG. 8 more specifically illustrates the method of processing stored-value card assembly 10 for sale. At 160, the point-of-sale terminal (POS), such as a cash register, sale kiosk, etc., is placed in a range entry mode. In range entry mode, the POS terminal is configured to read or receive a range of account identifiers 40 for activation rather than just one account identifier 40.

At 162, account identifier 40 of the first stored-value card 12 in stored-value card assembly 10 is scanned through external wrapper 18 at the POS terminal. In one example, account identifier 40 of the first stored-value card 12 is identified by a "1," "First," or other order indicia 122 configured to direct the retail employee or consumer to account identifier 40 of the first, rather than the last, stored-value card 12. At 164, the number of stored-value cards 12 in stored-value card assembly 10 is optionally input into the POS terminal. In one embodiment, the number to be input is indicated on sleeve 16 by indicia 126. In other embodiments, method 156 continues from 162 directly to 166 without entering the number of stored-value cards at 164.

At 166, the last stored-value card 12 in stored-value card assembly 10 is scanned through external wrapper 18 at the POS terminal. In one example, account identifier 40 of the last stored-value card 12 is identified by a "2," "Last," or other order indicia 122. At 168, POS terminal compares account identifier 40 of first stored-value card 12 to account identifier 40 of last stored-value card 12 to determine the number of stored-value cards 12 corresponding within the range of account identifiers capped by the account identifiers 40 of first and last stored-value cards 12. For example, if account identifier 40 of first stored-value card 12 is "1029" and account identifier 40 of last stored-value card 12 is "1020," then the account identifier 40 of last stored-value card 12 is subtracted from account identifier 40 of first stored-value card 12 to determine that ten account identifiers 40 are in the scanned range, and as a result, that ten stored-value cards are included in stored-value card assembly 10.

In one embodiment in which the number of stored-value cards 12 was entered at 164, then the number of stored-value cards 12 within the range is compared to the expected number of stored-value cards 12 identified at 164. If the numbers match, the process continues. If the numbers do not match, the stored-value card assembly 10 may be flawed and a new stored-value card assembly 10 is substituted or the selected stored-value card assembly 10 is inspected for a missing stored-value card 12 or other flaw. In other embodiments, the verification of the number of stored-value cards 10 at steps 164 and as included in step 168 is eliminated.

At 170, a monetary value to be placed on each stored-value card 12 in stored-value card assembly 10 is entered into the POS terminal. The monetary value can be pre-assigned to stored-value card assembly 10, or a consumer can specify at the POS terminal the monetary value he/she wishes to place on each stored-value card 12 in stored-value card assembly 10. Accordingly, the POS terminal accesses the financial account or record linked to all cards within the range (i.e., all cards within stored-value card assembly 10) and adds the monetary value entered to each of the accessed financial accounts or records. In one embodiment, upon entering the value in the POS terminal, the retail employee or other individual writes the value placed on each stored-value card 12 on sticker 134. At 172, the consumer pays for the stored-value card assembly 10, which, in one embodiment, is equal to the total amount of value loaded onto stored-value cards 12. Once the transaction is complete, each stored value card 12 in stored-value card assembly 10 is activated at 172.

At 180, the consumer removes external wrapper 18 and removes backers 14 and stored-value cards 12 from sleeve 16. In one embodiment, at least one stored-value card 12 of stored-value card assembly 10 is removed from card wrapper 50 and coupled to a corresponding backer 14 as described above. Backer 14 is folded to enclose stored-value card 12. At 182, the consumer optionally gives each stored-value card 12 to a recipient, such as an employee, graduate, relative, friend, expectant parents, one having a recent or impending birthday, couple having a recent or impending anniversary, etc. As an alternative, the consumer keeps one or more stored-value cards 12 for his or her own use. At 184, the consumer optionally returns any unused stored-value cards 12 to the retail store if the consumer desires to do so.

At 186, the consumer or recipient, whoever is in current ownership or otherwise is the current bearer of each stored-value card 12, redeems the respective stored-value card 12 for goods and/or services from the retail store. At 188, the current bearer of stored-value card 12 optionally adds value to stored-value card 12, and more particularly, to the financial account or financial record associated with stored-value card 12, at the retail store or over the Internet. Upon redeeming stored-value card 12 at 186 or adding value to stored-value card 12 at 188, the current bearer of stored-value card 12 subsequently can perform the other steps 186 or 188 as desired. In one embodiment, the ability of the current bearer to repeat redeeming stored-value card 12 at 186 is limited by whether the financial account or record associated with stored-value card 12 has any value at the time of attempted redemption.

Although described above as occurring at a single retail store, in one embodiment, purchasing stored-value card assembly 10 at 154, redeeming stored-value card 12 at 186, and adding value to stored-value card 12 at 188, can each be performed at any one of a number of stores adapted to accept stored-value card 12 or over the Internet. In one example, the number of stores are in a chain of similarly branded stores. In one example, the number of stores includes at least one website and/or at least one conventional brick and mortar store.

In one embodiment, the plurality of stored-value cards 12 in stored-value card assembly 10 are generic gift cards not specifically related to any particular occasion or holiday. Accordingly, such stored-value card assemblies 10 can be purchased by a wide range of consumers for a wide range of purposes. In one embodiment, the plurality of stored-value cards 12 in stored-value card assembly 10 are related to a particular holiday, event, or occasion. In one example, each stored-value card 12 is related to the same occasion, such as a birthday, and stored-value card assembly 10 is offered as a party pack or other assembly providing stored-value cards 12 for the purpose of distribution as door prizes, game prizes, gifts, etc. for guests at a birthday party. With this in mind, the plurality of backers 14 may also relate to the holiday, event, or occasion corresponding with stored-value cards 12.

In another example, stored-value card assembly 10 includes stored-value cards 12 for a plurality of different occasions, such as holidays, events, occasions, etc. As such, once a consumer purchases stored-value card assembly 10, the consumer has a plurality of stored-value cards 12 that can be given as gifts to different individuals for different reasons, such as holidays, occasions, etc. In one embodiment, backers 14 are each related to one of the plurality of different occasions to corresponding with a holiday or occasion related to one or more of stored-value cards 12. Accordingly, in one example, each stored-value card 12 is matched and coupled to a corresponding backer 14 prior to being given to a recipient.

Figure 9A:
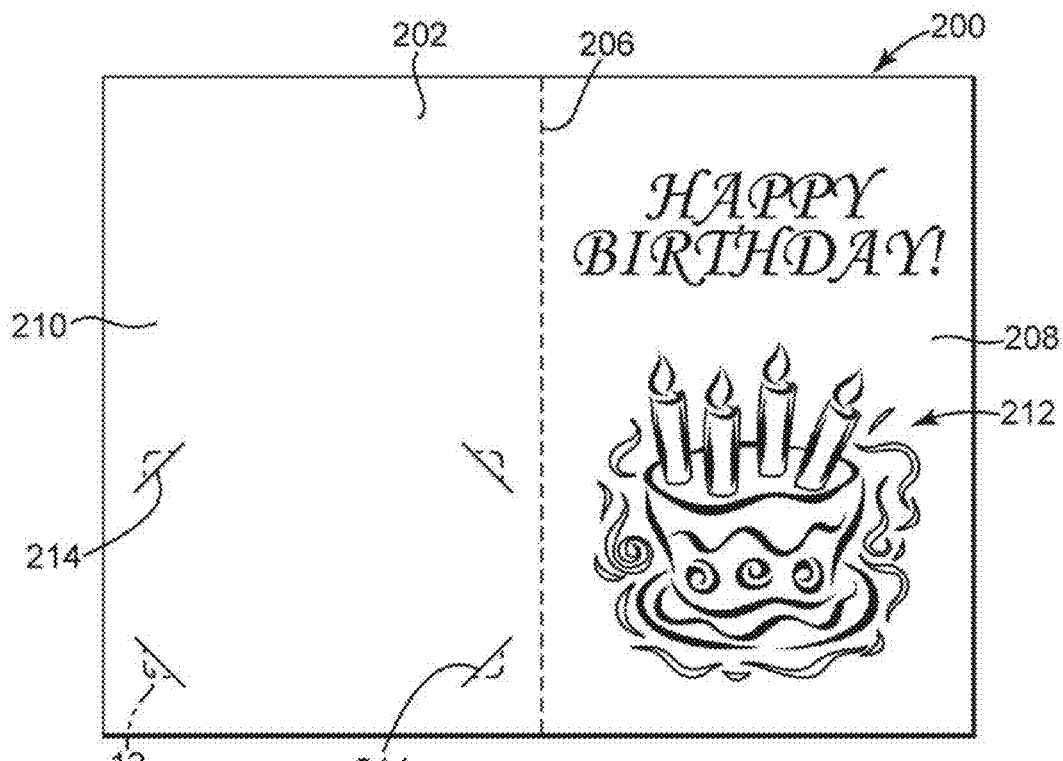
FIG. 9A is a front view of one embodiment of an unfolded greeting card for a stored-value card assembly, according to the present invention.
Figure 9B:
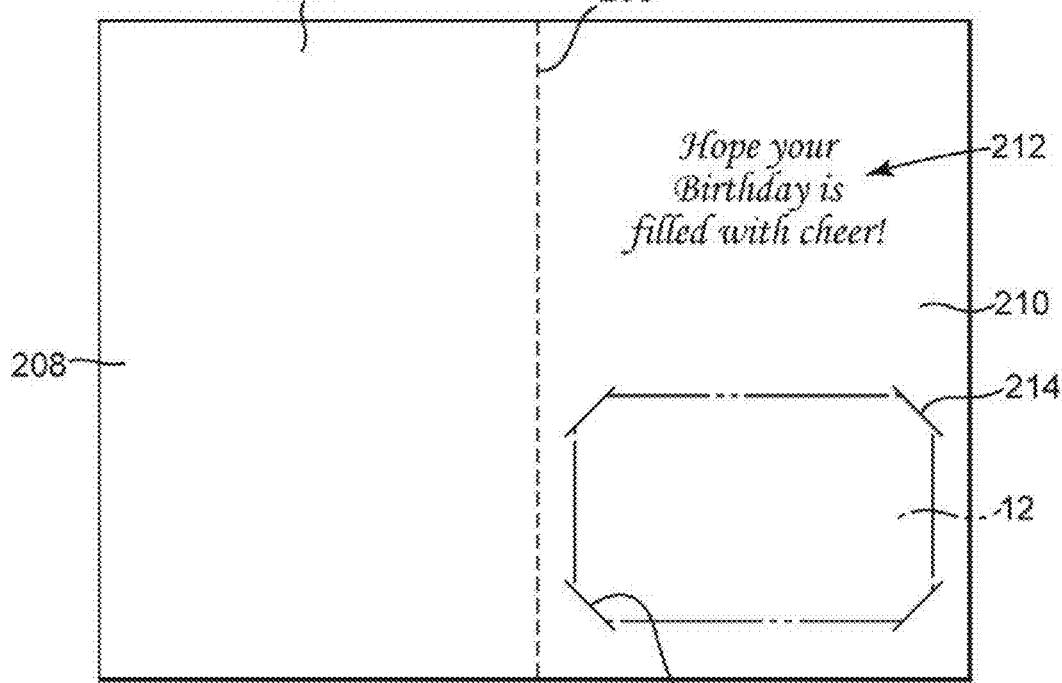
FIG. 9B is a back view of the unfolded greeting card of FIG. 9A.

As illustrated with reference to FIGS. 9A and 9B, in one embodiment, stored-value card assembly 10 includes a plurality of greeting cards 200 as an alternative to or in addition to backers 14. As described with backers 14, each greeting card can relate to an occasion or holiday corresponding with an occasion or holiday of one of stored-value cards 12. In one embodiment, in which all stored-value cards 12 are generic, greeting cards 200 can also be generic or may each be related to a variety of holidays or occasions.

In particular, in one embodiment, each greeting card 200 comprises a single layer or multiple layers of paper or plastic material, for example, generally in the form of a relatively stiff but bendable/flexible card. Other materials are also contemplated. In FIGS. 9A and 9B, greeting card 200 is unfolded, i.e. is in an open configuration. FIG. 9A illustrates outside surface 202, and FIG. 9B illustrates inside surface 204. Greeting card 200 includes a fold line 206 dividing greeting card 200 into first panel 208 and second panel 210.

First panel 208 and/or second panel 210 include decorative indicia 212 including graphics, text, or other information including store logo(s), store name(s), slogans, advertising, instructions, directions, brand indicia, promotional information, holiday indicia, seasonal indicia, media format identifiers, characters, etc. In one embodiment, second panel 210 includes slits 214 similar to slits 86 of backer 14 (illustrated in FIGS. 4A and 4B) to receive stored-value card 12 or other means for coupling stored-value card 12 to greeting card 200. In one embodiment, greeting card 200 does not include means for being coupled with stored-value card 12, but rather receives stored-value card 12 and/or backer 14 in a loose manner. Greeting card 200 is folded about fold line 206 to move inside surface of first panel 208 to meet inside surface of second panel 210. Accordingly, whether secured to greeting card 200 or loosely laid in greeting card 200, stored-value card 12 is interposed between first and second panels 208 and 210.

Stored-value cards come in many forms, according to embodiments of the invention. The gift card, like other stored-value cards, can be "re-charged" or "reloaded" at the direction of the original consumer, a gift recipient, or a third party. The term "loading on" or "loaded on" herein should be interpreted to include adding to the balance of a financial account or a financial record associated with the stored-value card. The balance associated with the stored-value card declines as the card is used, encouraging repeat visits to the retail store. The stored-value card remains in the user's purse or wallet, serving as an advertisement or reminder to re-visit the associated merchant as well. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value cards may be purchased in a non-activated state and a consumer can subsequently activate each or a range of stored-value cards by phone or over the Internet prior to giving the stored-value cards as a gift(s) to a desired recipient(s). Other modifications within the scope of the invention and its various embodiments will be apparent to those of ordinary skill.

What is claimed is:

1. A method of providing and processing a plurality of stored-value cards, the method comprising:
    providing a stored-value card assembly including the plurality of stored-value cards maintained in a housing, the plurality of stored-value cards including a first stored-value card and a last stored-value card, wherein:
        each of the plurality of stored-value cards is associated with a different account identifier linking each respective one of the plurality of stored-value cards to a different financial record or account,
        the different account identifiers of the plurality of stored-value cards collectively define a series of account identifiers bounded by the different account identifier associated with the first stored-value card and the different account identifier associated with the last stored-value card; and
    scanning the different account identifier associated with the first stored-value card using a point-of-sale terminal to enter the different account identifier of the first stored-value card into the point-of-sale terminal; and
    scanning the different account identifier associated with the last stored-value card using the point-of-sale terminal to enter the different account identifier of the last stored-value card into the point-of-sale terminal, wherein the housing indicates which of the different account identifier associated with the first stored-value card and the different account identifier associated with the last stored-value card should be scanned first.

2. The method of claim 1, wherein each of the different account identifiers is a different bar code, and scanning the different account identifier associated with the first stored-value card includes scanning the different bar code associated with the first stored-value card.

3. The method of claim 1, further comprising:
    identifying the series of account identifiers based on the different account identifier associated with the first stored-value card and the different account identifier associated with the last stored-value card entered into the point-of-sale terminal and characterized by an absence of scanning other ones of the different account identifiers using the point-of-sale terminal; and
    activating each of the different financial records or accounts linked to the plurality of stored-value cards based on the identified series of account identifiers, wherein each of the plurality of stored-value cards are configured for use toward a purchase price only after activating each of the different financial records or accounts.

4. The method of claim 3, wherein the plurality of stored-value cards includes at least three stored-value cards, and the method is characterized by reading only the different account identifier associated with the first stored-value card and the different account identifier associated with the last stored-value card of the series of account identifiers prior to activating the plurality of stored-value cards.

5. The method of claim 3, wherein activating each of the different financial records or accounts includes:
    entering a common monetary value to be added to each of the different financial records or accounts linked to the plurality of stored-value cards upon activation of the plurality of stored-value cards.

6. The method of claim 1, wherein only the different account identifier associated with the first stored-value card and the different account identifier associated with the last stored-value card of the series of account identifiers are provided for unobscured scanning by the point-of-sale terminal.

7. The method of claim 1, wherein scanning the different account identifier associated with the first stored-value card includes scanning the different account identifier associated with the first stored-value card directly from the first stored-value card.

8. The method of claim 1, wherein each of the different financial records or accounts is associated with a predetermined monetary value prior to activating the plurality of stored-value cards, and upon activation, each of the plurality of stored-value cards is redeemable as payment toward one or more purchases, and the payment is equal to the predetermined monetary value.

9. The method of claim 1, wherein providing the stored-value card assembly includes providing a plurality of backers within the housing, wherein each of the plurality of backers is configured to support one of the plurality of stored-value cards for presentation to a recipient.

10. The method of claim 1, wherein the plurality of stored-value cards are stacked into one or more stacks and the housing is formed of a planar piece of material folded to surround at least four sides of one or more stacks.

11. The method of claim 1, wherein the housing encloses the plurality of stored-value cards.

12. A method of providing and processing a plurality of financial transaction cards, the method comprising:
    providing a financial transaction card assembly including the plurality of financial transaction cards and a package, wherein:
        the plurality of financial transaction cards includes a first financial transaction card and a last financial transaction card,
        each of the plurality of financial transaction cards corresponds with a different bar code linking the corresponding one of the plurality of financial transaction cards to a different one of a plurality of financial accounts or records, each of the financial transaction cards is printed with the different bar code corresponding thereto, the different bar codes are a sequential range of different bar codes, the package substantially encloses all of the plurality of financial transaction cards, and the different bar code corresponding with the first financial transaction card and the different bar code corresponding with the last financial transaction card collectively indicate boundaries of the sequential range of different bar codes;

using a register, configured to process a retail sale, to scan the different bar code corresponding with the first financial transaction card; and using the register to scan the different bar code corresponding with the last financial transaction card after reading the different bar code corresponding with the first financial transaction card, wherein the package indicates which of the different bar code of the first financial transaction card and the different bar code of the last financial transaction card should be read by the register first.

13. The method of claim 12, further comprising:

using the register to determine the plurality of financial accounts or records based solely on the different bar code corresponding with the first financial transaction card and the different bar code corresponding with the last financial transaction card as previously scanned by the register; and activating each of the plurality of financial transaction cards by updating each of the plurality of financial accounts or records determined by the register to allow the plurality of financial transaction cards to be individually used as payment toward one or more retail purchases following activation of each of the plurality of financial transaction cards.

14. The method of claim 13, wherein the plurality of financial transaction cards includes at least three financial transaction cards, and the method is characterized by scanning only the different bar code corresponding with the first financial transaction card and the different bar code corresponding with the last financial transaction card of the sequential range of different bar codes prior to activating each of the plurality of financial transaction cards.

15. The method of claim 12, wherein providing the financial transaction card assembly includes providing the different bar code corresponding with the first financial transaction card and the different bar code corresponding with the last financial transaction card of the sequential range of different bar codes in a manner unobscured by the package for reading by the register, while other ones of the different bar codes are obscured by the package.

16. The method of claim 12, wherein using the register to read the different bar code corresponding with the first financial transaction card includes reading the different bar code corresponding with the first financial transaction card directly from the first financial transaction card.

17. The method of claim 12, wherein providing the financial transaction card assembly includes providing a plurality of backers within the package, wherein each of the plurality of backers is configured to support one of the plurality of financial transaction cards for presentation to a recipient.

18. The method of claim 12, wherein the plurality of financial transaction cards are stacked into one or more stacks, and the package is formed of a planar piece of material folded to surround at least four sides of one or more stacks.

19. The method of claim 12, wherein the package encloses the plurality of financial transaction cards.

20. A method of providing and processing a plurality of stored-value cards, the method comprising:

providing a stored-value card assembly including the plurality of stored-value cards maintained in a housing, the plurality of stored-value cards including a first stored-value card and a last stored-value card, wherein:

each of the plurality of stored-value cards is associated with a different account identifier linking each respective one of the plurality of stored-value cards to a different financial record or account, the different account identifiers of the plurality of stored-value cards collectively define a series of account identifiers bounded by the different account identifier associated with the first stored-value card and the different account identifier associated with the last stored-value card, and only the different account identifier of the first stored-value card and the different account identifier of the last stored-value card of the series of account identifiers are provided in a manner unobscured by the housing;

scanning the different account identifier associated with the first stored-value card using a point-of-sale terminal to enter the different account identifier of the first stored-value card into the point-of-sale terminal;

scanning the different account identifier associated with the last stored-value card using the point-of-sale terminal to enter the different account identifier of the last stored-value card into the point-of-sale terminal, wherein the housing indicates which of the different account identifier associated with the first stored-value card and the different account identifier associated with the last stored-value card should be scanned first; and identifying the series of account identifiers based on the different account identifier associated with the first stored-value card and the different account identifier associated with the last stored-value card entered into the point-of-sale terminal and characterized by an absence of scanning other ones of the different account identifiers using the point-of-sale terminal; and activating each of the different financial records or accounts linked to the plurality of stored-value cards based on the identified series of account identifiers, wherein each of the plurality of stored-value cards are configured for use toward a purchase price only after activating each of the different financial records or accounts;

wherein the plurality of stored-value cards includes at least three stored-value cards, and the method is characterized by reading only the different account identifier associated with the first stored-value card and the different account identifier associated with the last stored-value card of the series of account identifiers prior to activating the plurality of stored-value cards.

* * * * *